United States Patent [19]
Yoshida et al.

[11] Patent Number: 5,343,999
[45] Date of Patent: Sep. 6, 1994

[54] FEEDING APPARATUS

[75] Inventors: Koji Yoshida; Shouichi Nishimura, both of Ogaki, Japan

[73] Assignee: Kabushiki Kaisha N-Tech, Gifu, Japan

[21] Appl. No.: 128,214

[22] Filed: Sep. 29, 1993

[30] Foreign Application Priority Data
Nov. 24, 1992 [JP] Japan .................. 4-086843

[51] Int. Cl.⁵ .......................................... B65G 47/34
[52] U.S. Cl. ........................ 198/468.11; 198/468.01; 198/748
[58] Field of Search ............. 198/430, 468.01, 468.9, 198/468.1, 468.11, 740, 747, 748

[56] References Cited
U.S. PATENT DOCUMENTS 4,524,860  6/1985  Misawa et al. ............... 198/740
5,092,449  3/1992  Bolin et al. .................. 198/740 X

FOREIGN PATENT DOCUMENTS 0239773  10/1986  Fed. Rep. of Germany ............ 198/468.01
0055018   3/1986  Japan ................... 198/468.11

Primary Examiner—James R. Bidwell
Attorney, Agent, or Firm—Armstrong, Westerman, Hattori, McLeland & Naughton

[57] ABSTRACT

A feeding apparatus including a base frame, a first movable frame which is movably supported on the base frame so as to move in a first direction, a second movable frame which is movably supported on the first movable frame so as to move in a second direction different from the first direction, servo-motors with drive pulleys on the base frame, first rollers provided on the first movable frame on opposite sides of the second movable frame, second rollers provided on the second movable frame, and a belt wound about the drive pulleys and the first and second rollers.

13 Claims, 6 Drawing Sheets

FEEDING APPARATUS

BACKGROUND OF THE INVENTION

1. Field of the Invention

The present invention relates to a feeding apparatus which aligns and conveys bottles or tableware such as dishes or cups, etc., made by a bottle making machine or other making machines into a lehr or drying furnace from a conveyer.

2. Description of Related Art

In general, a stacker is used to feed products, such as glass bottles or glass tableware, etc., in a manufacturing line thereof. The stacker successively feeds, for example, a large number of bottles aligned on a front conveyer located in front of the lehr into the latter in a direction perpendicular to the direction of the movement of the front conveyer in synchronization with the movement of the front conveyer. To this end, it is necessary to synchronously move the stacker in at least two orthogonal directions in combination.

The movement of the stacker in predetermined directions is carried out, for example, by a cam mechanism.

In such a known feeding apparatus, the movement of the stacker must be varied or controlled depending on the kind of the bottles to be fed or an arrangement (direction of alignment, etc.) of the bottles within the lehr. To vary the movement of the stacker, it is necessary to replace the cam with another cam. In view of a large variety of products (tableware, etc.), the replacement of the cam is troublesome and requires long time.

The assignee of the present application has proposed a feeding apparatus which comprises a base frame, a first movable frame which is moved in backward and forward by a first actuator, a second movable frame which is moved in right and left directions by a second actuator, a third movable frame which is moved up and down by a third actuator, and a pusher provided on the third movable frame.

In this proposed apparatus, since the stacker is independently moved in the three orthogonal directions (back and forward, right and left, and up and down) by the respective actuators independent from each other, a desired complex movement can be easily obtained. However, since the movement of the stacker in a diagonal direction is realized by a combination of the movement thereof in the two or three orthogonal directions, no smooth movement of the stacker can be executed. Furthermore, the provision of the three actuators not only makes the whole feeding apparatus heavy and expensive, but also increases the outputs of motors to drive the actuators.

SUMMARY OF THE INVENTION

It is an object of the present invention to provide a simple, light and inexpensive feeding apparatus in which a complicated movement thereof in different directions can be easily controlled.

According to the present invention, there is provided a feeding apparatus comprising a base frame, a first movable frame which is movably supported on the base frame so as to move in a first direction, a second movable frame which is movably supported on the first movable frame so as to move in a second direction different from the first direction, a plurality of separate drivers on the base frame, first rollers provided on the first movable frame on opposite sides of the second movable frame, second rollers provided on the second movable frame, and a connecting band-like member connecting the separate drivers and the first and second rollers and wound about the first and second rollers so as to change the lengths of the portions of the connecting member that are located between the first and second rollers and the associated drivers when the latter are driven, said connecting band-like member being secured at opposite ends to the second movable frame.

For example, the drivers are servo-motors with drive pulleys.

Preferably, the band-like member is a belt wound about the drive pulleys and the first and second rollers.

The first and second directions can be perpendicular to each other.

Preferably, provision is made of a first guide member provided on the base frame, so that the first movable frame can be moved along the first guide member, and a second guide member provided on the first movable frame, so that the second movable frame can be moved along the second guide member.

It is possible to provide an actuator to move the second movable frame in a third direction different from the first and second directions. The third direction can be a substantially vertical direction.

BRIEF DESCRIPTION OF THE DRAWINGS

The invention will be described below in detail with reference to the accompanying drawings, in which.

DESCRIPTION OF THE PREFERRED EMBODIMENT

Figure 1:
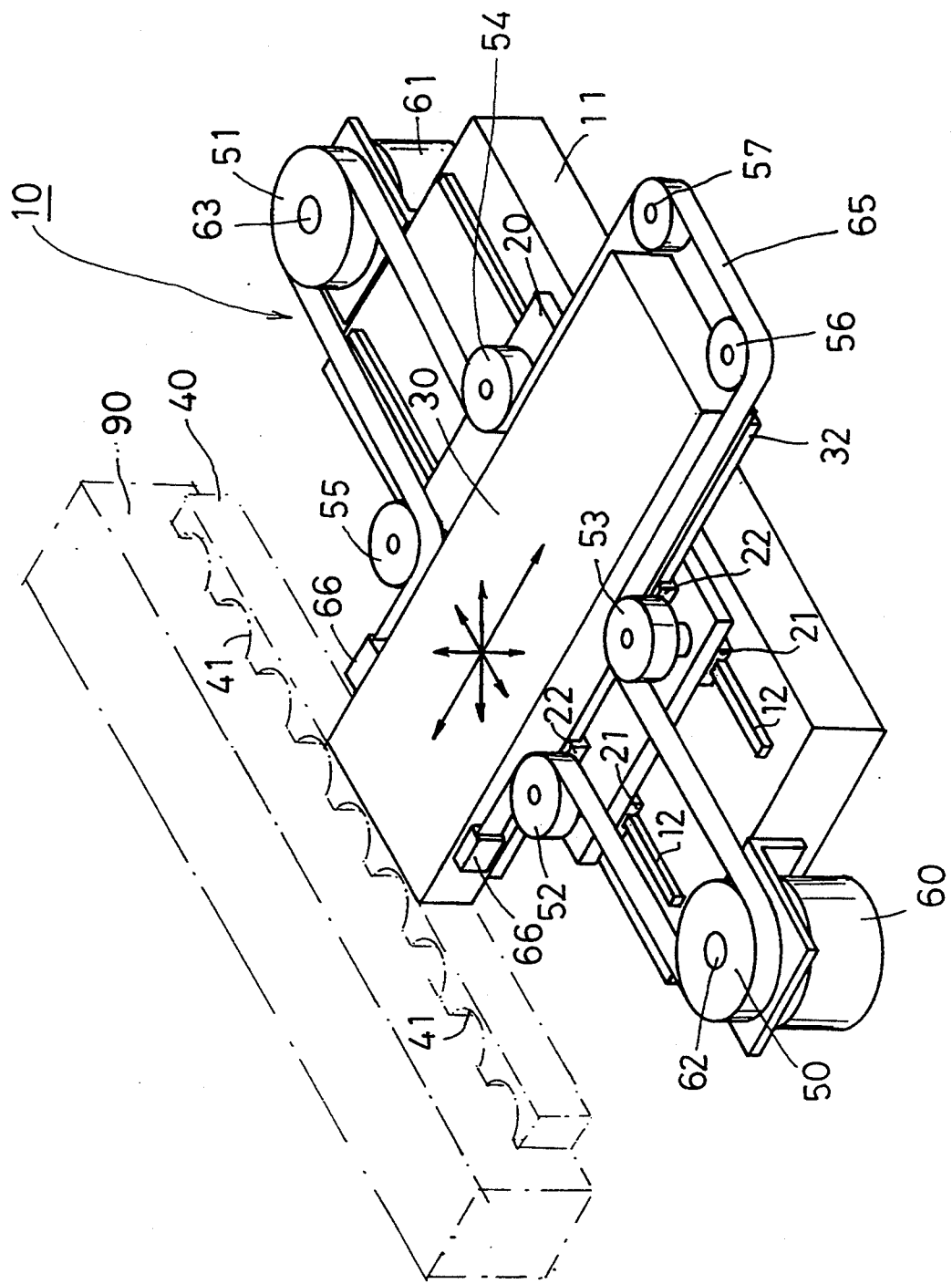
FIG. 1 is a perspective view of a feeding apparatus according to the present invention.

As can be seen in FIG. 1, a feeder 10 essentially includes a stationary base frame 11, a first movable frame 20 which is movable in the lateral direction (right and left directions), a second movable frame 30 which is movable back and forward, and a pusher 40. Bottles or other products to be conveyed by a conveyer (not shown) are fed in a direction perpendicular to the direction of the movement of the conveyer into a lehr 90 in synchronization with the movement of the conveyer.

The base frame 11 which is made of a rectangular plate is provided on an upper surface thereof with a pair of parallel guide rails 12, and on right and left end faces thereof with servo-motors 60 and 61, respectively. The servo-motors 60 and 61 have drive shafts 62 and 63 to which identical left and right drive pulleys 50 and 51 are secured, so that the pulleys 50 and 51 are rotated by the respective servo-motors.

The first movable frame 20 is provided on a bottom surface thereof with sliding members (channeled projections) 21 which are slidably fitted on the corresponding guide rails 12 so as to move along therewith, so that the first movable frame 20 can be moved on the base frame 11 (substrate) in right and left hand directions in FIG. 1. The first movable frame 20 is provided on the upper surface thereof with right and left guide rails 22 in which parallel sliding members (elongated projections) 32 of the second movable frame 30 are slidably fitted, so that the second movable frame 30 can be moved back and forward on the first movable frame 20 along the guide rails 22 in Fig. 1.

The first movable frame 20 is provided on the upper surface thereof with two pairs of pulleys 52, 53, 54 and 55 (first rollers) located on opposite sides of the second movable frame 30. Namely, the second movable frame 30 is movable between the pulleys 52, 53 and the pulleys 54 and 55. The second movable frame 30 is provided on the rear end face thereof with a pair of pulleys 56 and 57 (second rollers).

The pusher 40 has a predetermined number of bottle holding portions 41 to hold the corresponding bottles, as indicated by a phantom line in Fig. 1. The pusher 40 is secured to the front end of the second movable frame 30. When the second movable frame 30 is moved back and forward, the pusher 40 is moved between a lehr 90 and a conveyer (not shown) to feed the bottles from the conveyer into the lehr 90.

A single belt 65 is wound about the left and right pulleys 50 and 51 which are rotated by the respective servo-motors 60 and 61, the pulleys 52, 53, 54 and 55 provided on the first movable frame 20, and the pulleys 56 and 57 provided on the second movable frame 30. The ends of the belt 65 are secured to left and right belt holders 66, 66 provided on the left and right side faces of the second movable frame 30 in the vicinity of the front end thereof.

The movement of the first and second movable frames 20 and 30 are performed by the respective servo-motors 60 and 61. Namely, when the left and right pulleys 50 and 51 are rotated in the same direction or different directions at same or different rotational speeds to drive the belt 65, the lengths of the portions of the belt 65 between the belt holders 66 and the corresponding pulleys 50 and 51 are changed. Consequently, the positions of the first and second movable frames 20 and 30 are controlled.

The servo-motors 60 and 61 are rotated, so that the directions and the rotational speeds thereof are associated with each other. Namely, the directions of the movements of the first and second movable frames 20 and 30 are optionally varied, so that a smooth change of the direction of the movement of the pusher 40 in not only two orthogonal directions (left-right and back-forward directions), but also any diagonal directions takes place.

Alternatively, the pulleys 50 through 57 can be replaced with sprocket wheels per se known. In this alternative, a chain is used instead of the belt 65.

Figure 2:
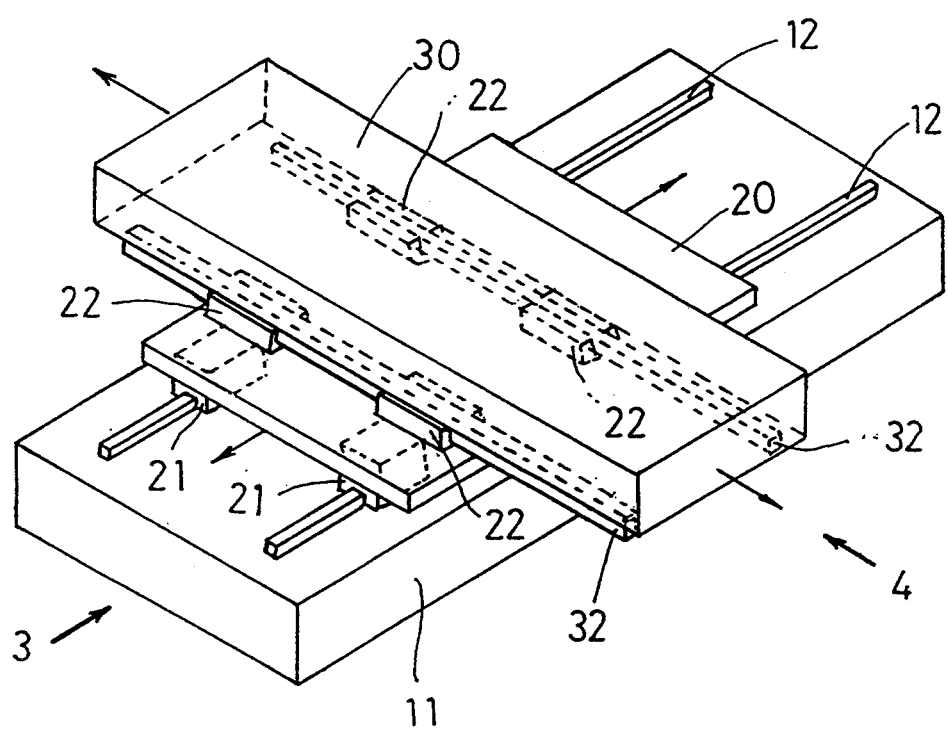
FIG. 2 is a perspective view of first and second movable frames in a feeding apparatus shown in FIG. 1.
Figure 3:
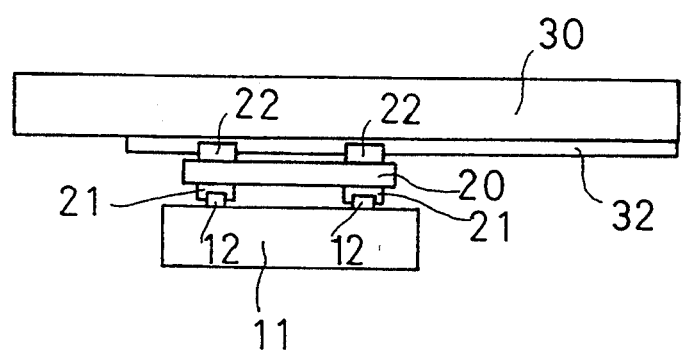
FIGS. 3 and 4 are end views viewed in the directions indicated at arrows 3 and 4 in FIG. 2, respectively.
Figure 4:
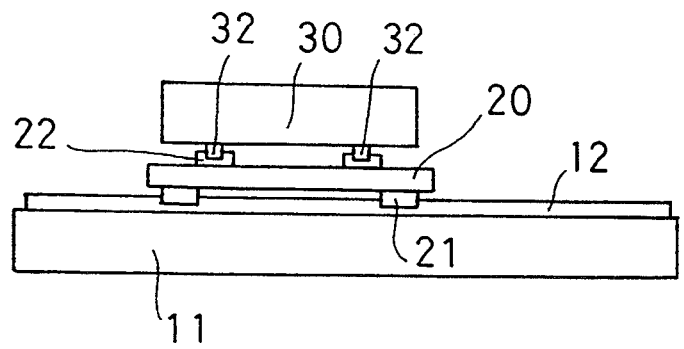

FIGS. 5A through 5H show different operational positions of the second movable frame 30 (and accordingly the pusher 40). The elements corresponding to those in FIGS. 1 and 2 are designated with like reference numerals.

Figure 5A:
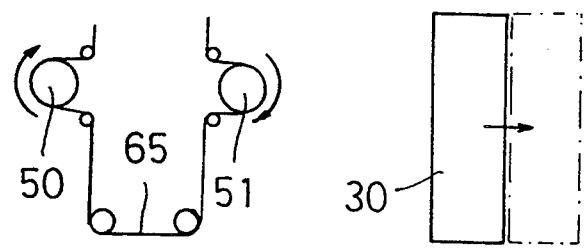
FIGS. 5A through 5H are explanatory views of a feeding apparatus shown in different operational positions; and, FIGS. 6 and 7 are respectively front elevational view and right side elevational view of a feeding apparatus according to another embodiment of the present invention.
Figure 5B:
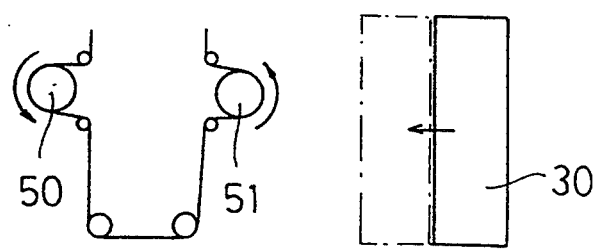
Figure 5C:
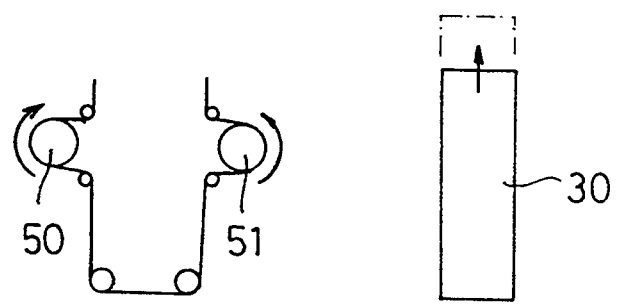
Figure 5D:
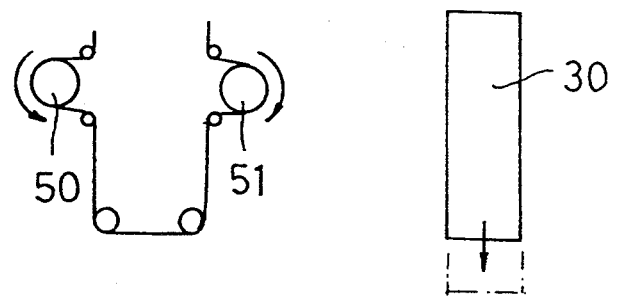

In FIG. 5A, when the pulleys 50 and 51 are rotated in the clockwise direction at the same rotational speed, the second frame 30 (pusher 40) is moved in the right direction. When the pulleys 50 and 51 are rotated in the counterclockwise direction at the same rotational speed, the second frame 30 (pusher 40) is moved in the left direction, as can be seen in FIG. 5B. When the pulleys 50 and 51 are rotated in the clockwise and counterclockwise directions at the same rotational speed, respectively, the second frame 30 (pusher 40) is moved forward, as shown in FIG. 5C. Conversely, when the pulleys 50 and 51 are rotated in the counterclockwise and clockwise directions at the same rotational speed, respectively, the second frame 30 (pusher 40) is moved backward, as shown in FIG. 5D.

Figure 5E:
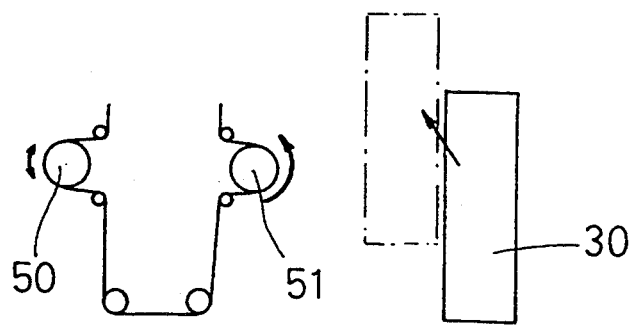
Figure 5F:
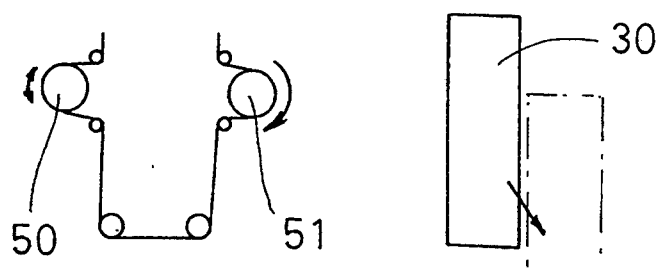

As shown in FIG. 5E, when the pulley 50 is stopped or rotated in the clockwise or counterclockwise direction at a rotational speed smaller than that of the pulley 51 which is rotated in the counterclockwise direction, the second frame 30 (pusher 40) is moved in a diagonal upper left direction. Conversely, when the pulley 50 is stopped or rotated in the clockwise or counterclockwise direction at a rotational speed smaller than that of the pulley 51 which is rotated in the clockwise direction, the second frame 30 (pusher 40) is moved in a diagonal lower right direction, as shown in FIG. 5F.

Figure 5G:
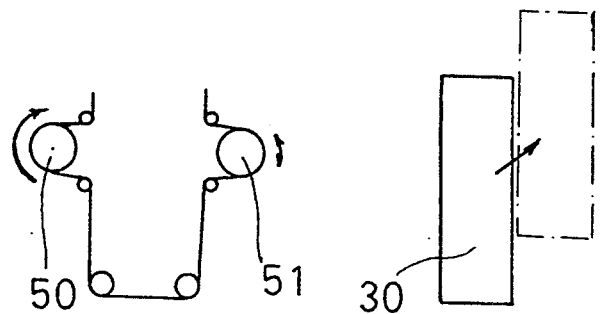
Figure 5H:
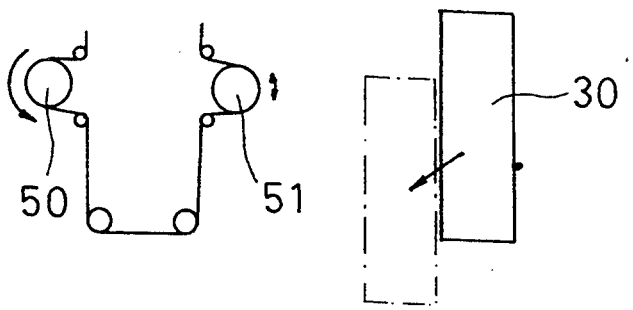

Moreover, when the pulley 50 is rotated in the clockwise direction and the pulley 51 is stopped or rotated in the clockwise or counterclockwise direction at a speed smaller than that of the pulley 50, the second frame 30 (pusher 40) is moved in a diagonal upper right direction, as shown in FIG. 5G. Conversely, when the pulley 50 is rotated in the counterclockwise direction and the pulley 51 is stopped or rotated in the clockwise or counterclockwise direction at a speed smaller than that of the pulley 50, the second frame 30 (pusher 40) is moved in a diagonal upper left direction, as shown in FIG. 5H.

The speed of the movement of the second movable frame 30 (pusher 40) in the diagonal directions can be controlled by changing the relative rotational speed of the pulleys 50 and 51.

Table below shows the direction of the movement of the second movable frame 30 (pusher 40) in connection with the directions and speeds of the angular displacements of the pulleys 50 and 51, as discussed above.

|  | FIG. | | | | | | | |
| --- | --- | --- | --- | --- | --- | --- | --- | --- |
|  | A | B | C | D | E | F | G | H |
| pulley 50 | R | L | R | L | No | No | R | L |
| pulley 51 | R | L | L | R | L | R | No | No |
| pusher 4 | R | L | U | D | UL | LR | UR | LL |

Note:
R = right direction;
L = left direction;
No = no rotation or rotation at lower speed than the other pulley;
UL = upper left (diagonal) direction;
LL = lower left (diagonal) direction;
LR = lower right (diagonal) direction;
UR = upper right (diagonal) direction.

Figure 6:
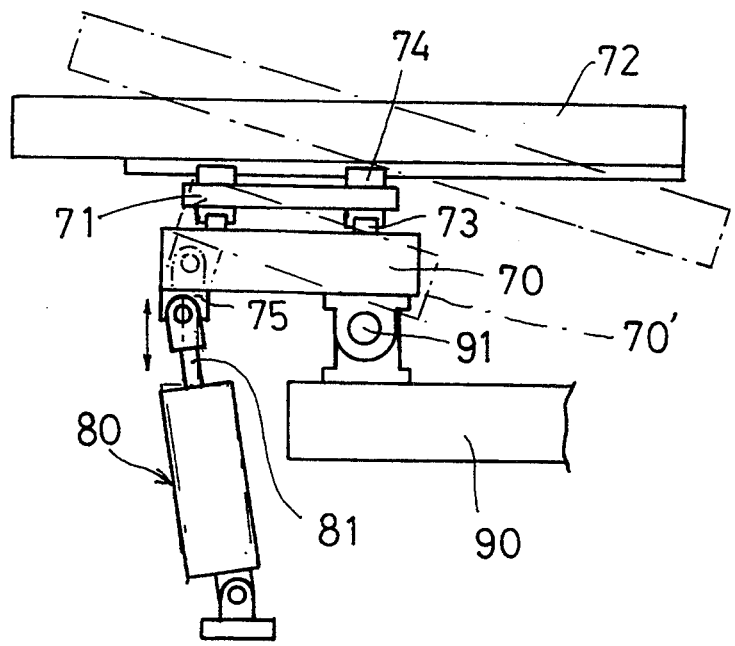
Figure 7:
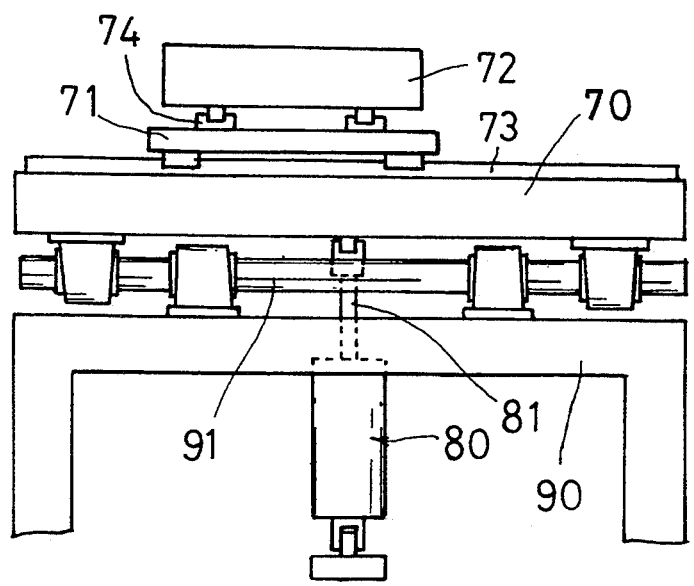

FIGS. 6 and 7 show another embodiment of a feeding apparatus according to the present invention. In FIGS. 6 and 7, a swingable base frame 70 is rotatably connected to a body frame 90 through a pivot 91. A hydraulic actuator 80 which is comprised of, for example, a hydraulic cylinder device having a piston 81, per se known is connected to one end of the base frame 70 through a mounting member 75, so that when the piston 81 is moved upward and downward in FIG. 6, the base frame 70 is rotated about the pivot 91 in the clockwise and counterclockwise directions, respectively, as shown by an imaginary line 70' to swing up and down the second movable frame 72 and accordingly the pusher 40 (FIG. 1), about the pivot 91. In FIGS. 6 and 7, 71 designates the first movable frame; 73 the guide rails provided on the base frame 70 and corresponding to the guide rails 12 in FIG. 1; and, 74 the guide rails provided on the first movable frame 71 and corresponding to the guide rails 22 in FIG. 1, respectively.

Note that, in the second embodiment shown in FIGS. 6 and 7, the movement of the pusher 40 (second movable frame 72) is not a linear movement but a rotational movement about the pivot 91. However, the movement of the pusher 40 can be deemed to be a linear movement, for example, if there is a large distance between the pivot 91 and the connection of the piston 81 and the base frame 70 or the stroke of the piston 81 is small.

Although the actuator 80 is in the form of a hydraulic cylinder device in the illustrated embodiment, the invention is not limited thereto. For example, the hydraulic actuator 80 can be replaced with a crank mechanism, cam mechanism, screw-jack, per se known, etc.

As can be seen from the above discussion, according to the present invention, a light, simple and inexpensive feeding apparatus can be realized. Furthermore, according to the present invention, the pusher can be easily moved back and forward, right and left, and/or up and down, by a simple mechanism.

We claim:

1. A feeding apparatus comprising:
a base frame;
a first movable frame which is movably supported on the base frame so as to move in a first direction;
a second movable frame which is movably supported on the first movable frame so as to move in a second direction different from the first direction;
a plurality of separate drivers on the base frame;
first rollers provided on the first movable frame on opposite sides of the second movable frame;
second rollers provided on the second movable frame; and,
a connecting band-like member connecting the separate drivers and the first and second rollers and wound about the first and second rollers so as to change the lengths of the portions of the connecting member that are located between the first and second rollers and the associated drivers when the latter are driven, said connecting band-like member being secured at opposite ends to the second movable frame.

2. A feeding apparatus according to claim 1, further comprising a pusher provided on one end of the second movable frame.

3. A feeding apparatus according to claim 1, wherein said drivers are servo-motors.

4. A feeding apparatus according to claim 3, further comprising drive pulleys secured to drive shafts of the servo-motors.

5. A feeding apparatus according to claim 4, wherein said band-like member is a belt wound about the drive pulleys and the first and second rollers.

6. A feeding apparatus according to claim 1, wherein said first and second directions are perpendicular to each other.

7. A feeding apparatus according to claim 1, further comprising a first guide member provided on the base frame, so that the first movable frame can be moved along the first guide member.

8. A feeding apparatus according to claim 7, further comprising a second guide member provided on the first movable frame, so that the second movable frame can be moved along the second guide member.

9. A feeding apparatus according to claim 8, wherein said first guide member extends perpendicularly to the second guide member.

10. A feeding apparatus according to claim 1, further comprising an actuator to move the second movable frame in a third direction different from the first and second directions.

11. A feeding apparatus according to claim 10, wherein said base frame is rotatably supported through a pivot and wherein said actuator comprises a hydraulic cylinder device having a piston connected to one end of the base frame.

12. A feeding apparatus according to claim 11, wherein the first, second and third directions are substantially orthogonal to each other.

13. A feeding apparatus according to claim 3, wherein the movement of the second movable frame is controlled by controlling the directions and rotational speeds of the servo-motors in combination.

* * * * *